(12) United States Patent
Harada et al.

(10) Patent No.: US 11,061,412 B2
(45) Date of Patent: Jul. 13, 2021

(54) INFORMATION PROCESSING DEVICE AND INFORMATION PROCESSING METHOD

(71) Applicant: SONY CORPORATION, Tokyo (JP)

(72) Inventors: Takeshi Harada, Tokyo (JP); Ryunosuke Oda, Tokyo (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/482,640

(22) PCT Filed: Dec. 25, 2017

(86) PCT No.: PCT/JP2017/046314
§ 371 (c)(1),
(2) Date: Jul. 31, 2019

(87) PCT Pub. No.: WO2018/163571
PCT Pub. Date: Sep. 13, 2018

(65) Prior Publication Data
US 2020/0014913 A1 Jan. 9, 2020

(30) Foreign Application Priority Data

Mar. 10, 2017 (JP) .............................. JP2017-045663

(51) Int. Cl.
*G05D 1/10* (2006.01)
*G06T 7/00* (2017.01)
*H04N 5/95* (2006.01)
*H04N 17/00* (2006.01)

(52) U.S. Cl.
CPC ............. *G05D 1/10* (2013.01); *G06T 7/0002* (2013.01); *H04N 5/95* (2013.01); *H04N 17/002* (2013.01)

(58) Field of Classification Search
CPC .......... G05D 1/10; G06T 7/0002; H04N 5/95; H04N 17/002; H04N 5/23222; H04N 5/2257; H04N 5/232941; G03B 43/00; G03B 7/30; G03B 15/006
See application file for complete search history.

(56) References Cited

U.S. PATENT DOCUMENTS

| | | | | |
|---|---|---|---|---|
| 2004/0169745 A1* | 9/2004 | Franz | ................... | H04N 17/002 348/241 |
| 2005/0219400 A1* | 10/2005 | Poulsen | ............. | H04N 1/00183 348/345 |
| 2008/0273753 A1 | 11/2008 | Giuffrida et al. | | |

(Continued)

FOREIGN PATENT DOCUMENTS

| | | |
|---|---|---|
| CN | 106412230 A | 2/2017 |
| JP | 09-247656 A | 9/1997 |

(Continued)

OTHER PUBLICATIONS

International Search Report and Written Opinion of PCT Application No. PCT/JP2017/046314, dated Mar. 20, 2018, 10 pages of ISRWO.

(Continued)

*Primary Examiner* — Timothy J Henn
(74) *Attorney, Agent, or Firm* — Chip Law Group (57) ABSTRACT

An information processing device that operates in an imaging device mounted on a mobile unit, and notifies the mobile unit of failed imaging, when imaging performed by the imaging device has failed.

20 Claims, 7 Drawing Sheets

(56) References Cited

U.S. PATENT DOCUMENTS

| | | | | |
|---|---|---|---|---|
| 2010/0045815 | A1* | 2/2010 | Tsuchiya | H04N 5/23238 348/222.1 |
| 2011/0013047 | A1* | 1/2011 | Watanabe | H04N 5/235 348/229.1 |
| 2011/0317049 | A1* | 12/2011 | Kurane | H04N 5/23203 348/294 |
| 2012/0269441 | A1* | 10/2012 | Marchesotti | G06K 9/6292 382/195 |
| 2016/0232971 | A1* | 8/2016 | Yoon | G11C 11/5657 |
| 2016/0309069 | A1* | 10/2016 | Steinberg | H04N 5/2257 |
| 2017/0142309 | A1 | 5/2017 | Hayashi et al. | |
| 2017/0163871 | A1* | 6/2017 | Irie | G03B 3/12 |
| 2018/0176425 | A1* | 6/2018 | Ma | H04N 5/06 |
| 2019/0253611 | A1* | 8/2019 | Wang | G06F 3/04842 |
| 2019/0297287 | A1* | 9/2019 | Oka | H04N 5/369 |
| 2020/0128230 | A1* | 4/2020 | Shikata | G09G 5/14 |

FOREIGN PATENT DOCUMENTS

| | | |
|---|---|---|
| JP | 2011-240745 A | 12/2011 |
| JP | 2017-034444 A | 2/2017 |

OTHER PUBLICATIONS

Office Action for CN Patent Application No. 201780087880.2 dated Nov. 2, 2020, 05 pages of Office Action and 08 pages of English Translation.

Office Action for CN Patent Application No. 201780087880.2, dated Apr. 1, 2021, 08 pages of English Translation and 05 pages of Office Action.

* cited by examiner

PLANNED IMAGING POSITIONS

FIG. 7B

ERROR EXAMPLE 1 IMAGING POSITION DEVIATION

FIG. 7C

ERROR EXAMPLE 2 IMAGING POSITION MISSING

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2017/046314 filed on Dec. 25, 2017, which claims priority benefit of Japanese Patent Application No. JP 2017-045663 filed in the Japan Patent Office on Mar. 10, 2017. Each of the above-referenced applications is hereby incorporated herein by reference in its entirety.

TECHNICAL FIELD

The present technology relates to an information processing device, an information processing method, and an information processing program.

BACKGROUND ART

In recent years, aerial photographing performed with a camera mounted on a mobile unit, a motorized miniature aircraft (an unmanned aircraft) called a drone, or the like has been increasing (Patent Document 1). Such photographing is adopted in various applications such as shooting of movies and TV dramas, and surveying, for example. In such photographing, a user (a photographer or a drone user) does not directly operate a camera, but controls the camera from a computer system serving as a host device, to obtain an image captured by automatic imaging.

CITATION LIST

Patent Document

Patent Document 1: Japanese Patent Application Laid-Open No. 2016-138788

SUMMARY OF THE INVENTION

Problems to be Solved by the Invention

In such a system that performs aerial photographing using a drone, the host device issues an imaging start command to the camera, and the camera receives this request and tries to perform imaging. However, depending on the situation at that time, imaging might not be performed. For example, imaging is not performed in a case where autofocusing is not successful and the shutter cannot be released, or in a case where a captured image cannot be written into a memory card as a storage, for example.

In such automatic imaging, if imaging is not successful, it is necessary to perform re-imaging. By the conventional method, successful imaging can be recognized through notification between systems, but failed imaging cannot be recognized. Therefore, it is necessary to determine whether imaging is successful after all the imaging has been completed.

The present technology has been made in view of such problems, and aims to provide an information processing device, an information processing method, and an information processing program that are capable of notifying a mobile unit whether imaging has failed in an imaging device mounted on the mobile unit.

Solutions to Problems

To solve the above problems, a first technology lies in an information processing device that operates in an imaging device mounted on a mobile unit, and notifies the mobile unit of failed imaging in a case where imaging performed by the imaging device has failed.

Further, a second technology lies in an information processing method for notifying a mobile unit of failed imaging in a case where imaging performed by an imaging device mounted on the mobile unit has failed.

Furthermore, a third technology lies in an information processing program that causes a computer to implement an information processing method for notifying a mobile unit of failed imaging in a case where imaging performed by an imaging device mounted on the mobile unit has failed.

Yet further, a fourth technology lies in an information processing device that operates in a mobile unit on which an imaging device is mounted, and determines whether or not imaging performed by the imaging device has failed.

MODE FOR CARRYING OUT THE INVENTION

Hereinafter, an embodiment of the present technology will be described with reference to the drawings. Note that explanation will be made in the following order.
<1. Embodiment>
[1-1. Configuration of a Mobile Unit]
[1-2. Configuration of an Imaging Device]
[1-3. Imaging Result Notification Process]
<2. Modifications>

1. Embodiment

[1-1. Configuration of a Mobile Unit]

Figure 1A:
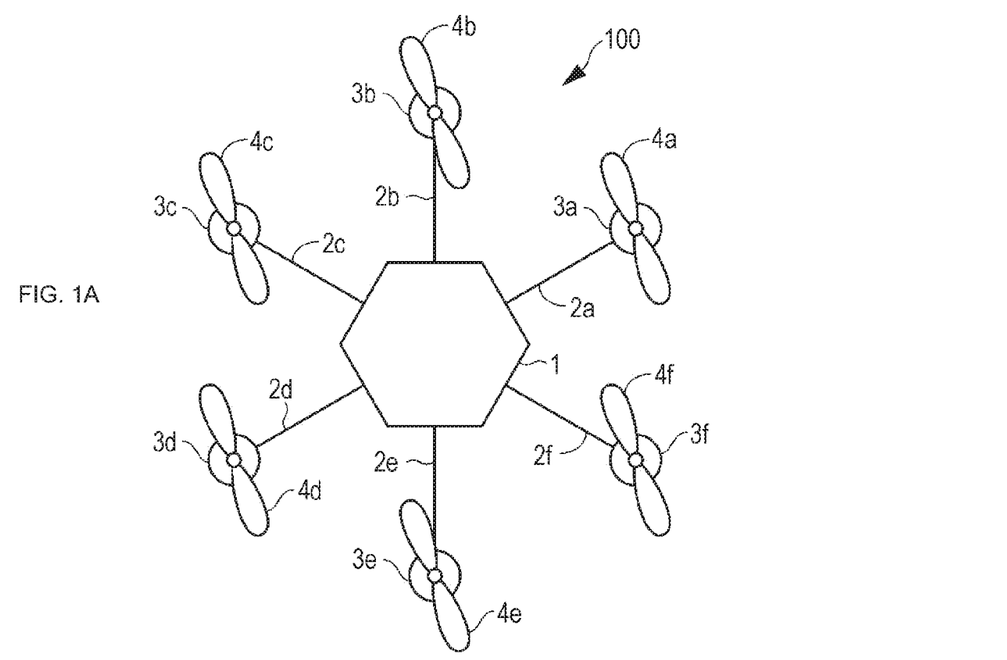
FIG. 1A is a plan view showing the appearance configuration of a mobile unit.
Figure 1B:
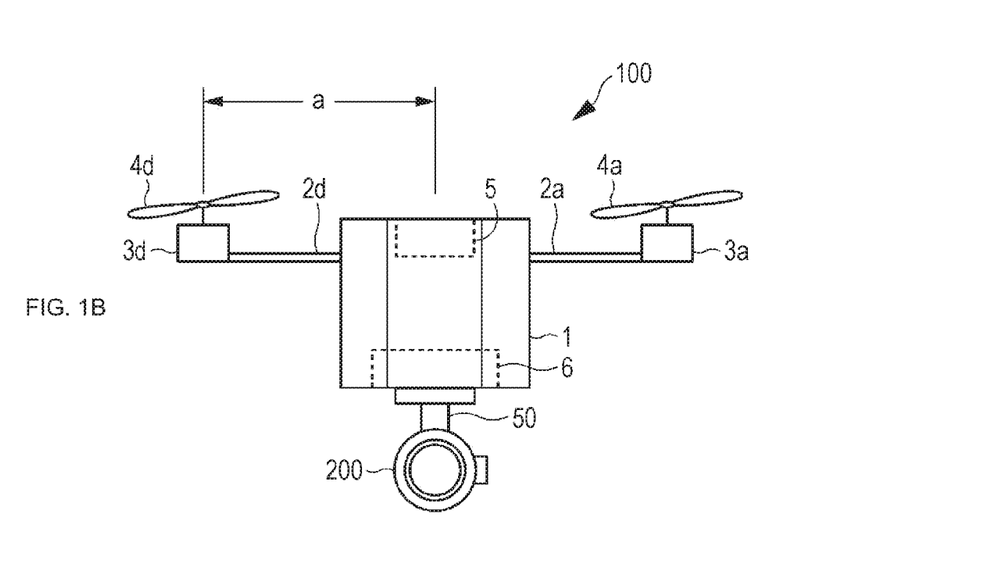
FIG. 1B is a side view showing the appearance configuration of the mobile unit.
Figure 2:
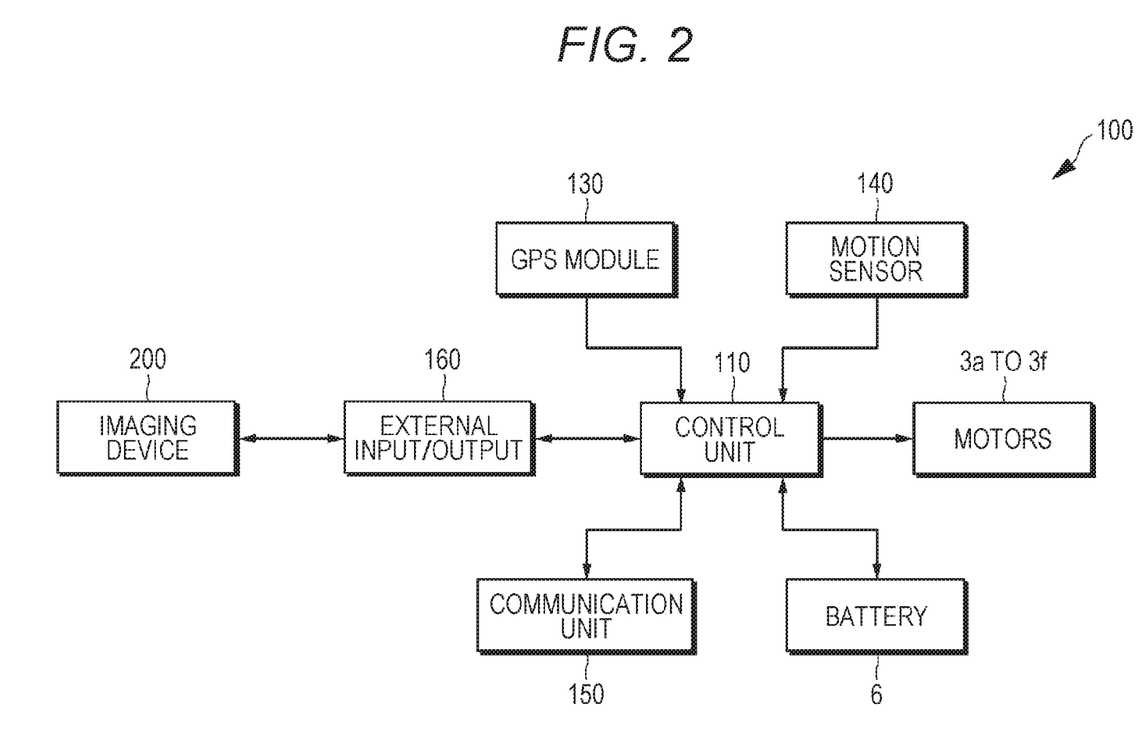
FIG. 2 is a block diagram showing the configuration of the mobile unit.

Referring to FIGS. 1A, 1B and 2, the configuration of a mobile unit 100 is described. In this embodiment, the mobile unit 100 is a motorized miniature aircraft (an unmanned aircraft) called a drone. FIG. 1A is a plan view of the mobile unit 100. FIG. 1B is a front view of the mobile unit 100. An airframe is formed with a cylindrical or polygonally cylindrical body portion 1 as the central portion, and support shafts 2a through 2f fixed to upper portions of the body portion 1, for example. As an example, the body portion 1 has the shape of a hexagonal cylinder, and six support shafts 2a through 2f radially extend from the center of the body portion 1 at equal angular intervals. The body portion 1 and the support shafts 2a through 2f are made of a lightweight, high-strength material.

Further, the shapes, the layout, and the like of the components of the airframe formed with the body portion 1 and the support shafts 2a through 2f are designed so that the center of gravity of the airframe is on a vertical line extending through the center of the support shafts 2a through 2f. Furthermore, a circuit unit 5 and a battery 6 are provided in the body portion 1 so that the center of gravity is on this vertical line.

In the example shown in FIGS. 1A and 1B, the number of rotors and the number of motors are both six. However, the configuration may include four rotors and four motors, or may include eight or more rotors and eight or more motors.

Motors 3a through 3f as the drive sources for the rotors are attached to the ends of the support shafts 2a through 2f, respectively. Rotors 4a through 4f are attached to the rotation shafts of the motors 3a through 3f. The circuit unit 5 including a control unit for controlling each motor is attached to the central portion at which the support shafts 2a through 2f intersect.

The motor 3a and the rotor 4a, and the motor 3d and the rotor 4d form a pair. Likewise, (the motor 3b and the rotor 4b) and (the motor 3e and the rotor 4e) form a pair, and (the motor 3c and the rotor 4c) and (the motor 3f and the rotor 4f) form a pair.

The battery 6 as a power source is disposed on the bottom surface in the body portion 1. The battery 6 includes a lithium-ion secondary battery and a battery control circuit that controls charging and discharging, for example. The battery 6 is detachably attached to the inside of the body portion 1. As the center of gravity of the battery 6 is matched with the center of gravity of the airframe, the stability of the center of gravity increases.

It is possible to navigate a motorized miniature aircraft, generally called a drone, as desired by controlling outputs of the motors. For example, in a hovering state in which the miniature aircraft stays still in the air, a tilt is detected with a gyroscope sensor mounted on the airframe. The motor output on the lowered side of the airframe is then increased, and the motor output on the raised side is reduced. In this manner, the airframe is kept horizontal. Further, when the aircraft is moving forward, the motor output in the direction of movement is reduced, and the motor output in the reverse direction is increased, so that the aircraft leans forward to generate a propulsive force in the direction of movement. In position control and propulsion control on such a motorized miniature aircraft, the above installation position of the battery 6 can balance stability of the airframe and ease of the control.

FIG. 2 is a block diagram showing the configuration of the mobile unit 100. The mobile unit 100 includes a control unit 110, a global positioning system (GPS) module 130, a motion sensor 140, a communication unit 150, an external input/output 160, the battery 6, and the motors 3a through 3f. Note that the support shafts, the rotors, and the like, which have been described above with reference to the exterior configuration of the mobile unit 100, are not shown in the drawing. The control unit 110, the GPS module 130, the gyroscope sensor, the communication unit 150, and the external input/output 160 are included in the circuit unit 5 shown in the external view of the mobile unit 100 in FIGS. 1A and 1B.

The control unit 110 includes a central processing unit (CPU), a random access memory (RAM) 203, a read only memory (ROM), and the like. The ROM stores a program to be read and executed by the CPU, and the like. The RAM is used as a work memory of the CPU. The CPU performs various processes according to the program stored in the ROM, and issues commands. By doing so, the CPU performs control such as setting and changing a flight course of the entire mobile unit 100, setting of the timing of imaging by an imaging device 200, issuing an imaging instruction to the imaging device 200, and the like.

The control unit 110 also controls the flight of the mobile unit 100 by controlling the outputs of the motors 3a through 3f.

The GPS module 130 acquires the current position and the altitude of the mobile unit 100, and the current time, and supplies the acquired information to the control unit 110. Imaging position information indicating the imaging position of an image captured by the imaging device 200, and imaging time information indicating the imaging time are acquired by the GPS module 130. Note that the imaging time information may be acquired by a timing function of the imaging device 200.

The motion sensor 140 detects motion of the mobile unit 100 with an acceleration sensor, an angular velocity sensor, a gyroscope sensor, or the like for two or three axial directions, for example. By doing so, the motion sensor 140 detects the moving velocity, the moving direction, the angular velocity at a time of circling, and the angular velocity about the Y-axis direction of the mobile unit 100, and supplies the detected information to the control unit 110.

The communication unit 150 is a communication module for communicating with an external device (a personal computer, a tablet terminal, a smartphone, or the like) that functions as a device for controlling the mobile unit 100 from the ground (this device is referred to as the base station). The mobile unit 100 transmits the state of the mobile unit 100 in flight to the base station through communication performed by the communication unit 150. The mobile unit 100 also receives an instruction and the like from the base station. The mobile unit 100 may further transmit an image captured by the imaging device 200 to the base station. The communication method at the communication unit 150 is Bluetooth (registered trademark) as wireless communication, a wireless local area network (LAN), Wi-Fi, ZigBee, or the like. Since the mobile unit 100 is an aircraft flying in the air, communication with the base station is performed through wireless communication.

The external input/output 160 is a communication terminal, a module, or the like of any appropriate kind that connects the mobile unit 100 to an external device by wired connection or wireless connection. In this embodiment, the imaging device 200 is connected to the mobile unit 100 by wired communication using a universal serial bus (USB). Note that it is possible to perform transmission and reception of electric power in addition to transmission and reception of data through USB communication, and accordingly, a battery may be provided in either the mobile unit 100 or the imaging device 200 while any battery is not provided in the other one.

[1-2. Configuration of an Imaging Device]

Figure 3:
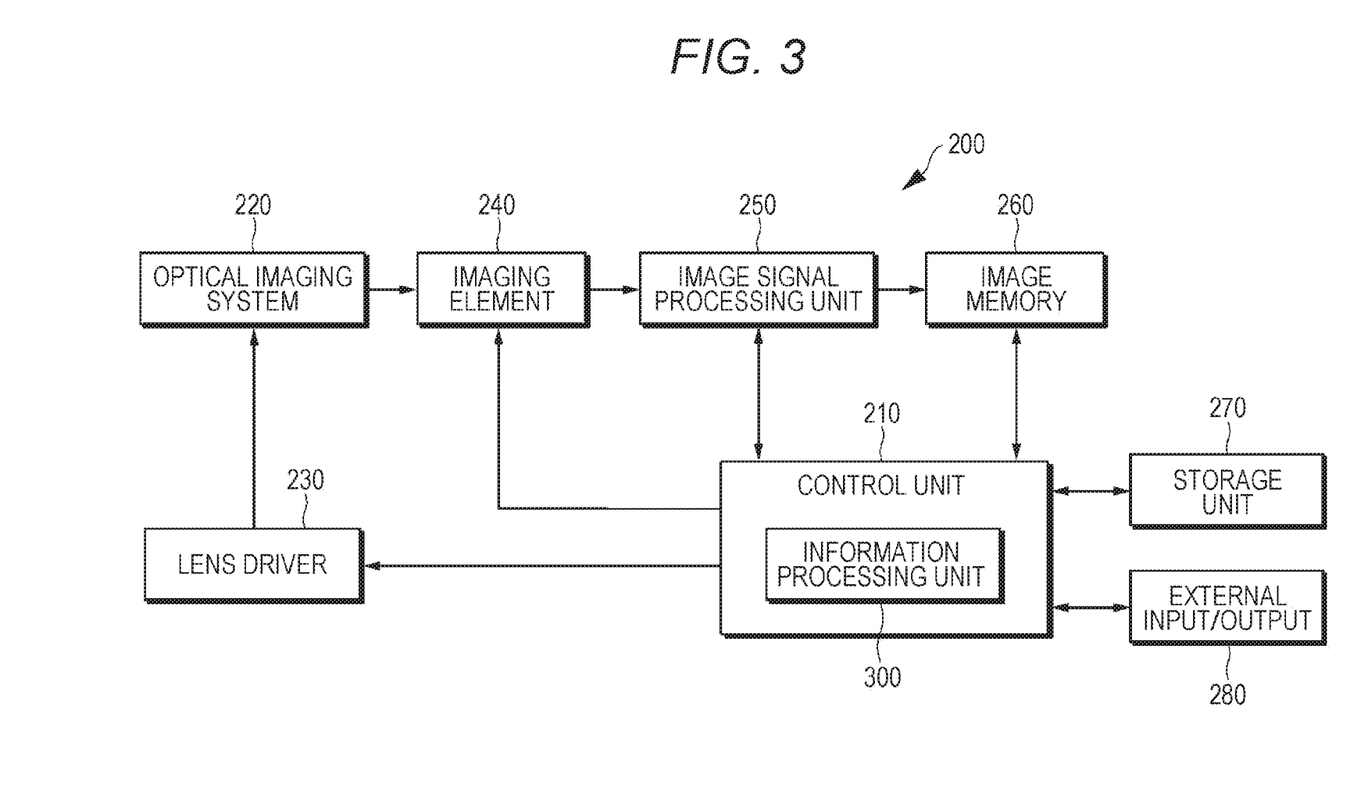
FIG. 3 is a block diagram showing the configuration of an imaging device.

Referring now to FIGS. 1A, 1B, and 3, the configuration of the imaging device 200 is described. FIG. 3 is a block diagram showing the configuration of the imaging device 200.

As shown in FIG. 1B, the imaging device 200 is attached to the bottom surface of the body portion 1 of the mobile unit 100 via a camera mount 50 so that the imaging device 200 is suspended. As the camera mount 50 is driven, the imaging device 200 can perform imaging while directing the lens 360 degrees in any direction from a horizontal direction to a vertical direction. Note that operation of the camera mount 50 is controlled by the control unit 110.

The imaging device 200 includes a control unit 210, an optical imaging system 220, a lens driver 230, an imaging element 240, an image signal processing unit 250, an image memory 260, a storage unit 270, and an external input/output 280.

The control unit 210 includes a CPU, a RAM, a ROM, and the like. The CPU controls the entire imaging device 200 by performing various processes according to a program stored in the ROM and issuing commands.

The control unit 210 also functions as an information processing unit 300. The information processing unit 300 determines whether imaging by the imaging device 200 is a success or a failure, and notifies the mobile unit 100 of the result. This aspect will be described later. Note that, as well as the mobile unit 100, the base station may be notified of the imaging result.

Note that the information processing unit 300 may be formed with a program, and the program may be installed beforehand in the imaging device 200, or may be downloaded and distributed in the form of a storage medium or the like and be installed into the imaging device 200 by the user. By executing the program, the control unit 210 may function as the information processing unit 300. Alternatively, the information processing unit 300 may be independent of the control unit 210. Further, the information processing unit 300 may be formed not only with a program, but also with a dedicated device, a circuit, or the like formed with hardware having the function.

The optical imaging system 220 includes an imaging lens for gathering light from an object onto the imaging element 240, a drive mechanism for moving the imaging lens to perform focusing and zooming, a shutter mechanism, an iris mechanism, and the like. These components are driven on the basis of control signals from the control unit 210 and the lens driver 230 of the imaging device 200. An optical image of the object obtained through the optical imaging system 220 is formed on the imaging element 240 of the imaging device 200.

The lens driver 230 is formed with a microcomputer, for example, and, under the control of the control unit 210, performs autofocusing by moving the imaging lens a predetermined amount in the optical axis direction, to achieve focusing on the target object. Under the control of the control unit 210, the lens driver 230 also controls operations of the drive mechanism, the shutter mechanism, the iris mechanism, and the like of the optical imaging system 220. Thus, the exposure time (the shutter speed), the aperture value (the F-number), and the like are adjusted.

The imaging element 240 photoelectrically converts incident light from the object into a charge amount, and outputs a pixel signal. The imaging element 240 then outputs the pixel signal to the image signal processing unit 250. The imaging element 240 is a charge coupled device (CCD), a complementary metal oxide semiconductor (CMOS), or the like.

The image signal processing unit 250 performs a sample-and-hold process for maintaining a preferable signal-to-noise (S/N) ratio through a correlated double sampling (CDS) process, an auto gain control (AGC) process, analog-to-digital (A/D) conversion, and the like on the imaging signal output from the imaging element 240, to create an image signal.

The image signal processing unit 250 may also perform predetermined signal processing, such as a demosaicing process, a white balance adjustment process, a color correction process, a gamma correction process, a Y/C conversion process, an auto exposure (AE) process, and a resolution conversion process, on the image signal.

The image memory 260 is a buffer memory formed with a volatile memory such as a dynamic random access memory (DRAM), for example. The image memory 260 temporarily stores image data subjected to predetermined processing by the image signal processing unit 250.

The storage unit 270 is a large-capacity storage medium such as a hard disk or an SD memory card, for example. A captured image is stored in a compressed state on the basis of a standard such as Joint Photographic Experts Group (JPEG), for example. Further, Exchangeable Image File Format (EXIF) data including additional information, such as information about the stored image, imaging position information indicating the imaging position, and imaging time information indicating the imaging date and time, is also stored in association with the image. A moving image is stored in a format such as Moving Picture Experts Group 2 (MPEG2) or MPEG4, for example.

The external input/output 280 is a communication terminal, a module, or the like of any appropriate kind that connects the imaging device 200 to an external device by wired connection or wireless connection. In this embodiment, the imaging device 200 is connected to the mobile unit 100 through USB communication. The imaging device 200 receives various settings for imaging, an imaging instruction, and the like from the control unit 110 of the mobile unit 100 through the USB communication. The imaging device 200 further receives power supply from the battery 6 of the mobile unit 100 through USB communication.

The mobile unit 100 and the imaging device 200 are connected by a USB, and perform communication using Picture Transfer Protocol (PTP), which is a protocol for image transfer. With PTP, an image and the data accompanying the image can be transferred from the imaging device 200 such as a digital camera to the mobile unit 100, with no addition of a device driver. PTP is standardized as ISO 15740.

Figure 4:
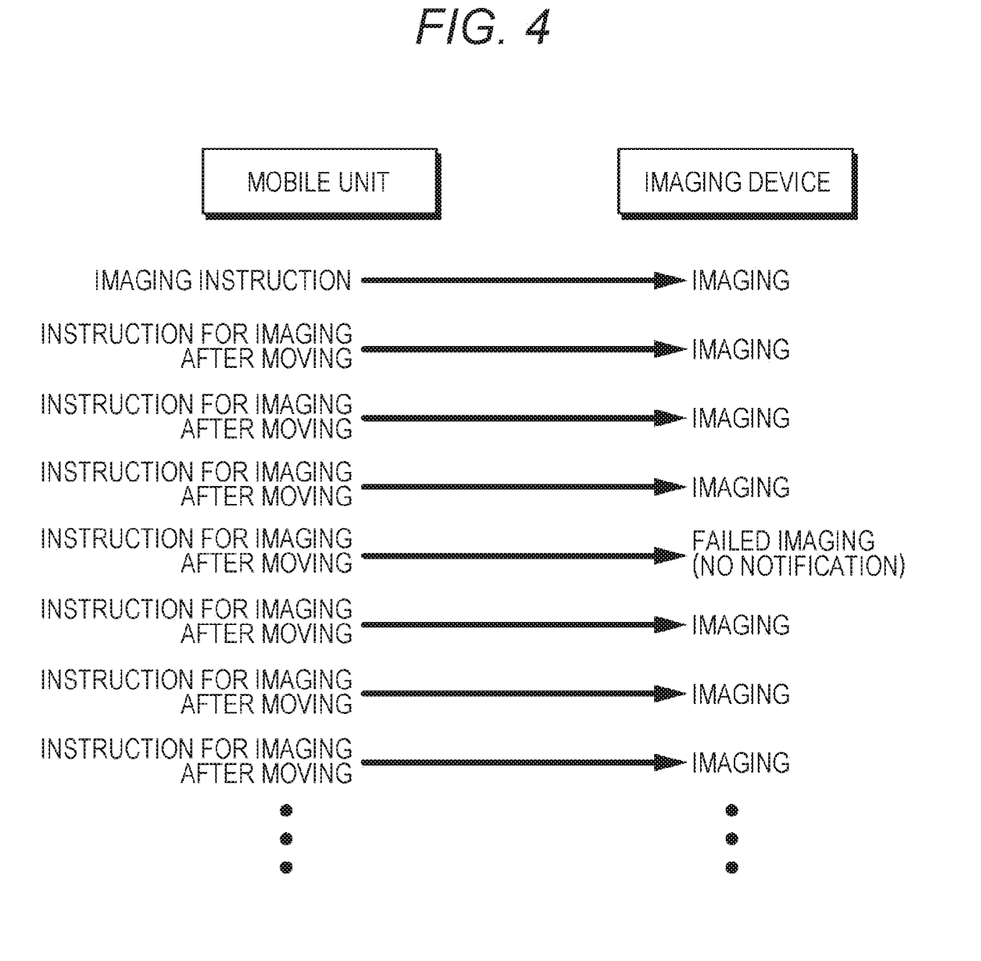
FIG. 4 is a schematic diagram illustrating conventional communication between a mobile unit and an imaging device.

PTP is basically a protocol that performs control by issuing a command from the host device to a device, but a mechanism called EVENT for notifying the host device from a device is also defined. Although an event of successful imaging is defined as a standard in PTP, there is no definition of failed imaging. Therefore, as shown in FIG. 4, in the communication between the imaging device 200 and the mobile unit 100, imaging instructions are transmitted unidirectionally from the mobile unit 100 to the imaging device 200. If imaging is failed, the mobile unit 100 is not notified of the failed imaging, and the next imaging is performed, with the failed imaging being left as it is.

Figure 5:
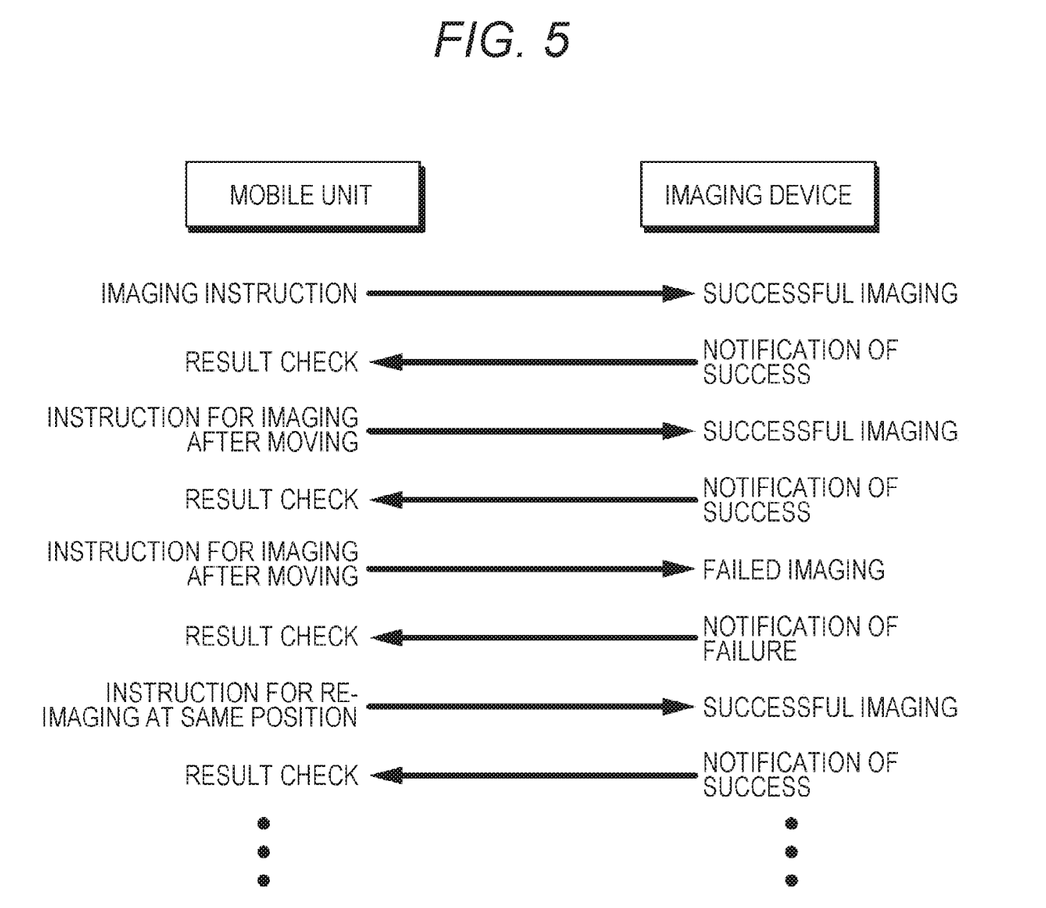
FIG. 5 is a schematic diagram illustrating communication between the mobile unit and the imaging device in the present technology.

However, since vendors are specified as extensible, failed imaging is defined as a vendor extension. Thus, the imaging device 200 can notify the mobile unit 100 of failed imaging when recognizing the failed imaging. The communication between the imaging device 200 and the control unit 110 of the mobile unit 100 at this time is performed as shown in FIG. 5, for example. The control unit 110 requests the imaging device 200 to start imaging. After that, in a case where a notification of successful imaging or failed imaging is received from the imaging device 200, and a notification of failed imaging is received from the imaging device 200, a re-imaging instruction or the like is issued as shown in FIG. 5, for example. The instruction to be issued to the imaging device 200 after receipt of a notification of failed imaging will be described later in detail.

The mobile unit 100 and the imaging device 200 are configured as described above. A motorized miniature aircraft called a drone can perform not only manual operation by the operator but also automatic flight and automatic imaging using GPS or the like. In a case where automatic flight and automatic imaging are performed, flight route information, and imaging information about the imaging position, the imaging direction, the imaging time, and the like are set in advance, and, in accordance with the contents of the settings, the control unit 110 of the mobile unit 100 controls the flight of the mobile unit 100 and issues an imaging instruction to the imaging device 200. Alternatively, the route information and the imaging information may be obtained from the base station through wireless communication.

In conventional cases, after imaging is completed, and the mobile unit 100 returns to the base station or to the user, the user needs to check the results of the automatic flight and the automatic imaging by looking at the captured images stored in the storage unit 270. In a case where the number of captured images is large, for example, the process of checking the results of the imaging is troublesome and time-consuming. Furthermore, if there is an imaging failure such as an out-of-focus image or an unsaved image, it is necessary to fly the mobile unit 100 again to perform re-imaging. Flying the mobile unit 100 again and performing re-imaging requires extra imaging costs and time. Therefore, by the present technology, the results of imaging are checked by the imaging device 200 while the mobile unit 100 is flying, and a notification is issued as to whether there is failed imaging.

In the present technology, an imaging failure occurs in a case where imaging has not been performed (or is not possible), or in a case where imaging has been performed, but the captured image does not satisfy a predetermined condition.

In a case where imaging has not been performed (or is not possible), the remaining capacity of the storage unit 270 storing captured images might be equal to or smaller than a predetermined amount, or the remaining amount in the battery 6 might be equal to or smaller than a predetermined amount. In a case where the remaining capacity of the storage unit 270 is equal to or smaller than a predetermined amount, imaging can be performed, but the captured images cannot be stored. In a case where the remaining amount in the battery 6 is equal to or smaller than a predetermined amount, the mobile unit 100 and/or the imaging device 200 might not operate, and the operation might stop halfway.

Further, in a case where imaging has not been performed (or is not possible), a writing error might have occurred at the time of storage of a captured image into the storage unit 270, and the captured image might have not been stored, or the imaging might have not been performed due to a failure, a malfunction, a mechanical error, a control error, or the like of the mobile unit 100 and/or the imaging device 200.

In a case where imaging has been performed but a captured image does not satisfy a predetermined condition, the captured image might be out of focus, or the exposure of the captured image might not be in a predetermined range. Whether or not the captured image is in focus can be determined by acquiring a focusing distance parameter (metadata) recorded at the time of imaging, and checking whether the focusing distance parameter is within a predetermined threshold range. If the focusing distance parameter is within the threshold range, the captured image is determined to be out of focus. If the focusing distance parameter is out of the threshold range, the captured image is determined to be in focus. To determine whether or not the exposure is within a certain range, the exposure value (EV), which is the value indicating the brightness of the exposure at the time of imaging, is stored in association with the captured image, and the EV is referred to.

Further, in a case where imaging has been performed, but the captured image does not satisfy a predetermined condition, a planned imaging position is set in advance, and the position at which imaging has actually been performed deviates from the planned imaging position. Furthermore, imaging timing might have been set so that imaging would be performed a plurality of times at predetermined distance intervals or time intervals, and the position or the time at which imaging has actually been performed does not match the distance intervals or the time intervals.

[1-2. Imaging Result Notification Process]

Figure 6:
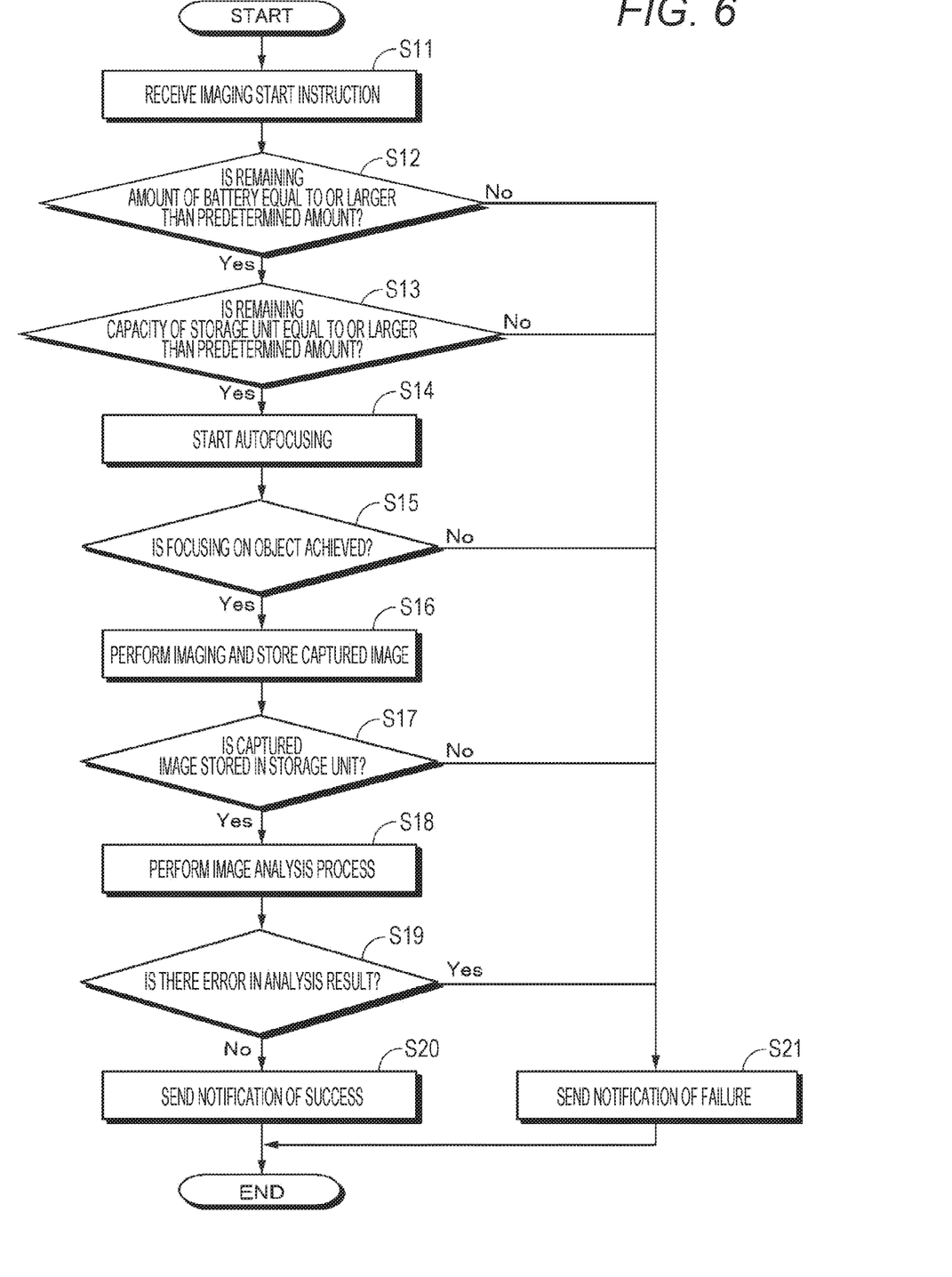
FIG. 6 is a flowchart showing the flow in an imaging result notification process.

Next, an imaging result notification process is described, with reference to FIG. 6. FIG. 6 is a flowchart showing the flow in an imaging result notification process to be performed by the information processing unit 300 and an imaging process to be performed by the imaging device 200.

First, in step S11, the imaging device 200 receives an instruction to start imaging from the mobile unit 100. The instruction to start imaging may be issued from the control unit 110 of the mobile unit 100 to the imaging device 200, or may be issued from an external device (such as a base station) that is neither the mobile unit 100 nor the imaging device 200, to the imaging device 200.

Next, in step S12, the information processing unit 300 determines whether or not the remaining amount in the battery 6 is equal to or larger than a predetermined amount. The predetermined amount is the sum of the remaining amount required to fly the mobile unit 100 in the flight route scheduled after the time of the determination and the remaining amount required to perform the scheduled imaging, for example. This can be performed by the information processing unit 300 receiving supply of remaining amount information about the battery 6 from the control unit 110 of the mobile unit 100 through USB communication. If the remaining amount in the battery 6 is equal to or larger than the predetermined amount, the process moves on to step S13 (Yes in step S12).

Next, in step S13, the information processing unit 300 determines whether or not the remaining capacity of the storage unit 270 is equal to or more than a predetermined amount. The predetermined amount is the capacity equivalent to the number of image pieces to be acquired in the imaging scheduled after the time of the determination, for example. If the number of image pieces to be formed is undecided, the capacity corresponding to 100 image pieces, a predetermined capacity such as a specific number of gigabytes, or the like may be set, or the user may set beforehand the number of image pieces to be formed.

If the remaining capacity of the storage unit 270 is equal to or larger than the predetermined amount, the process moves on to step S14 (Yes in step S13). Next, in step S14, when the mobile unit 100 reaches the planned imaging position, autofocusing is started by the imaging device 200. Next, in step S15, a check is made to determine whether or not focusing on the object is achieved within a predetermined time by the autofocusing performed by the imaging device 200.

If focusing on the object is achieved within the predetermined time (Yes in step S15), the imaging device 200 performs a process of performing imaging and storing the captured image into the storage unit 270 in step S16. Next, in step S17, the information processing unit 300 determines whether or not the captured image is stored in the storage unit 270. This can be performed by referring to the imaging time information about the latest image stored in the storage unit 270, for example. If the captured image is stored in the storage unit 270, the process moves on to step S18 (Yes in step S17).

Next, in step S18, the information processing unit 300 performs an image analysis process on the captured image. In this image analysis process, a check is made to determine whether the captured image is in focus, whether the exposure is within a certain range including the proper exposure, and the like. If the captured image is not in focus, or if the exposure is not within a certain range including the proper exposure, the analysis result indicates an error.

Further, in a case where imaging is performed at a predetermined planned imaging position, the imaging position information and the imaging time information that are stored and associated as EXIF data with the captured image are referred to in determining whether the imaging has been performed at the predetermined planed imaging position and the predetermined planned imaging time. If the imaging has not been performed at the predetermined planned imaging position and the predetermined planned imaging time, the analysis result indicates an error.

In a case where imaging is performed successively at constant distance intervals (imaging is performed every 10 m, for example), the imaging position information stored and associated with the captured image is referred to in determining whether or not the imaging position deviates from the constant distance. Further, in a case where imaging is successively performed at constant time intervals (imaging is performed every 10 seconds, for example), the imaging time information indicating the imaging time stored and associated with the captured image is referred to in determining whether or not the imaging time deviates from the constant time intervals. A check can also be made to determine whether or not an imaging and storage process has been performed at the predetermined planned imaging position or the planned imaging time, by checking a log (a processing record) of the imaging device 200. Thus, a check can be made to determine whether or not imaging has been properly performed.

Figure 7A:
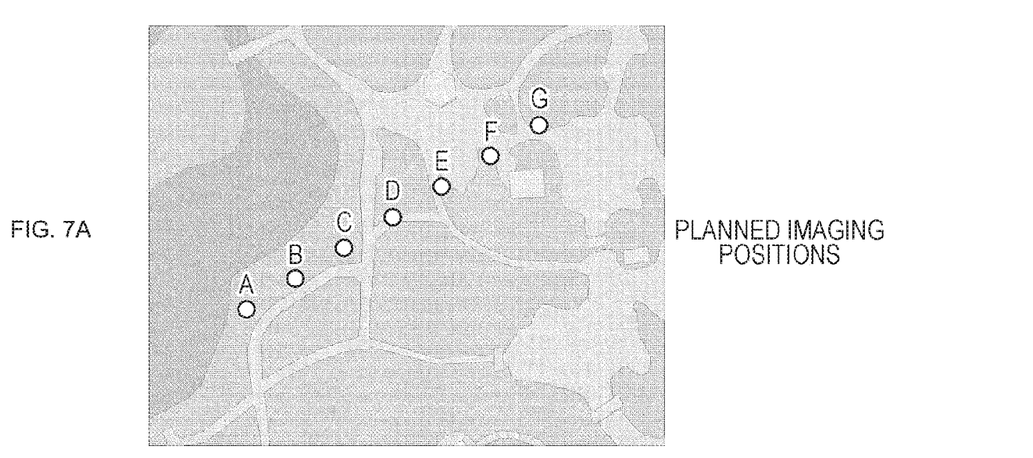
FIGs. 7A, 7B, and 7C are diagrams for explaining an example of analysis of captured images.
Figure 7B:
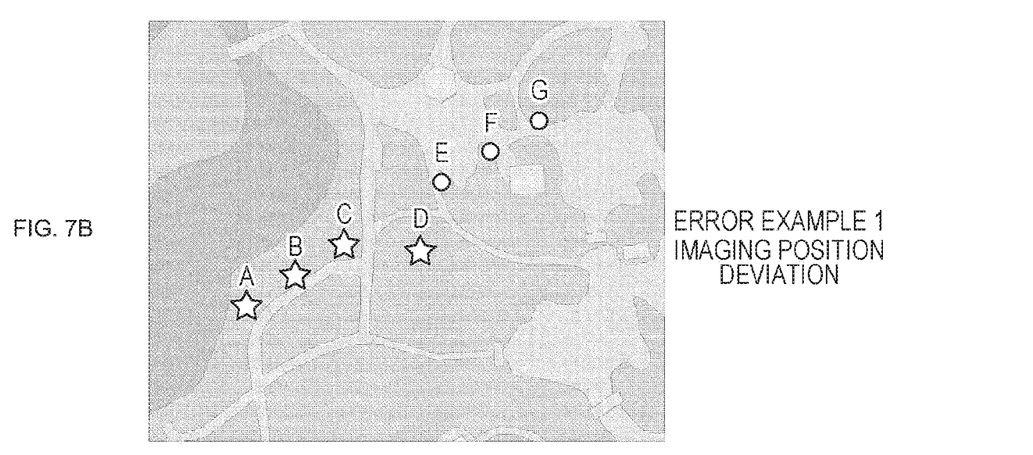
Figure 7C:
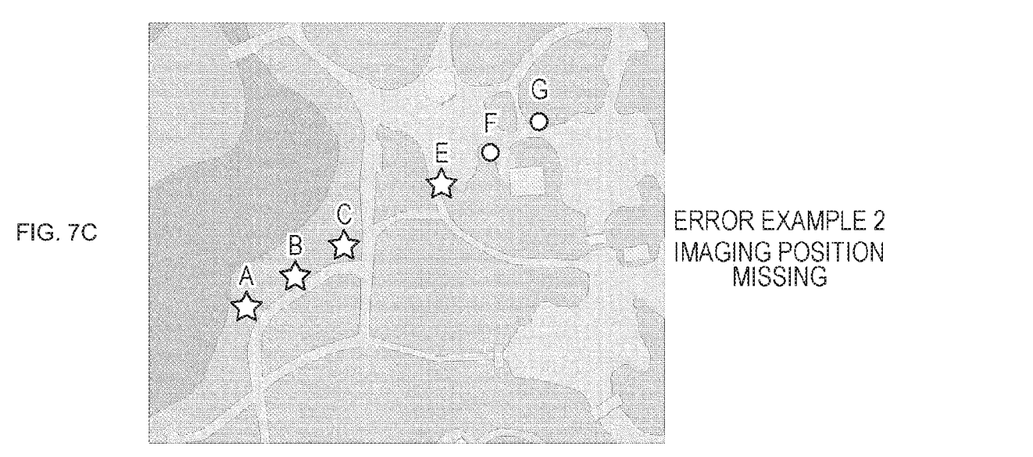

In examples shown in FIGS. 7A, 7B and 7C, points A through G on maps in FIGS. 7A, 7B and 7C are planned imaging positions at which imaging is to be performed at constant intervals, and star marks in FIGS. 7B and 7C indicate the imaging positions at which the images were captured.

In FIG. 7B, since the imaging position D deviates from the planned imaging position D, the analysis result of the image captured at the imaging position D indicates an error. Further, in FIG. 7C, since the imaging at the planned imaging position D is missing, and imaging has not been performed at the planned imaging position D, the analysis result indicates an error.

The explanation of the flowchart is now resumed. If there is no error as a result of the analysis process in step S18, the process moves from step S19 on to step S20 (No in step S19). In step S20, the information processing unit 300 then notifies the mobile unit 100 that the imaging is successful.

If the remaining capacity of the storage unit 270 is equal to or smaller than the predetermined amount in step S13 described above, if focusing on the object is not achieved within a predetermined time in step S15, if the captured image is not stored in the storage unit 270 in step S17, or if the analysis result indicates an error in step S19, the process moves on to step S21.

In step S21, the information processing unit 300 then notifies the mobile unit 100 that the imaging has failed.

The above process is performed for each image piece.

In a case where the control unit 110 of the mobile unit 100 receives a notification of an imaging failure from the imaging device 200, the control unit 110 performs a predetermined process in accordance with the type of the imaging failure. In a case where the remaining amount in the battery 6 is equal to or smaller than a predetermined amount, in a case where the remaining capacity of the storage unit 270 is equal to or smaller than a predetermined amount, or in a case where the mobile unit 100 and/or the imaging device 200 is broken, the control unit 110 performs control so that the mobile unit 100 returns to a predetermined position (the position of the base station, the position at which the user is present, or the like). This is because imaging cannot be performed in any of those cases. In this case, the user needs to replace or charge the battery 6, reinforce the storage unit 270, delete data for securing the remaining capacity of the storage unit 270, or repair the mobile unit 100 and/or the imaging device 200, for example. This control is performed by the control unit 110 resetting the flight route and controlling the flight of the mobile unit 100 to proceed along the reset flight route, for example. Alternatively, a flight route that is reset by the base station that has received a notification of failed or successful imaging from the mobile unit 100 may be obtained, and the flight of the mobile unit 100 may be controlled on the basis of the flight route. Further, the base station may be notified whether or not re-imaging is necessary after all the imaging results are obtained, the flight route may be obtained from the base station, and the flight of the mobile unit 100 may be controlled on the basis of the flight route.

Meanwhile, in a case where an image was captured but the imaging has failed, the control unit 110 of the mobile unit 100 returns to a position slightly before the failed imaging position and performs re-imaging at the failed imaging position, or causes the mobile unit 100 to keep moving and performs re-imaging at the failed imaging position after performing imaging at the last planned imaging position, or returns to the first position in the imaging route and restarts the imaging from the beginning. This control is performed by the control unit 110 resetting the flight route and controlling the flight of the mobile unit 100 to go along the reset flight route, for example. Alternatively, this control may be performed by obtaining the flight route that is reset by the base station that has received a notification of failed or successful imaging from the mobile unit 100, and controlling the flight of the mobile unit 100 on the basis of the flight route. Furthermore, the control may also be performed by notifying the base station whether or not re-imaging is necessary after all the imaging results are obtained, obtaining the flight route from the base station, and controlling the flight of the mobile unit 100 on the basis of the flight route. Note that, in a case where imaging positions or the number of image pieces to be formed is set in advance, for example, if failed imaging has been performed at a predetermined proportion (50%, for example) of the shooting positions or on the predetermined proportion of the image pieces, the control unit 110 may select a process of returning to the first position in the imaging route, and restarting the imaging from the beginning.

Such control is performed, because the imaging can be continued, and accordingly, the mobile unit 100 can perform re-imaging without returning to the base station or to the user. As the mobile unit 100 is notified that imaging has failed while the mobile unit 100 is flying and the imaging device 200 is performing imaging as described above, it is possible to retry the imaging without returning to the base station or to the user. Because of this, re-imaging can be performed quickly, and the time and costs required for the re-imaging can be reduced. Note that which of the above is to be performed may be set beforehand in the mobile unit 100, or may be selected and set by the user before the start of imaging.

The process according to the present technology is performed as described above. According to the present technology, it is possible to notify the mobile unit 100 whether or not imaging by the imaging device 200 has failed, directly from the imaging device 200 without any intervention of the user or another device. This enables re-imaging during flight, and can reduce the time and costs required for the re-imaging after that.

2. Modifications

Although an embodiment of the present technology has been specifically described so far, the present technology is not limited to the above embodiment, and various modifications based on the technical idea of the present technology may be made to the embodiment.

In the embodiment described above, the information processing unit 300 operates in the imaging device 200, and notifying the mobile unit 100 of failed or successful imaging. However, the information processing unit 300 may operate in the mobile unit 100. In this case, the information processing unit 300 receives, from the imaging device 200, the remaining capacity information about the storage unit 270, information as to whether or not focusing on the object is achieved, and an image captured by the imaging device 200, and then determines whether the imaging has failed or succeeded. The determination result is then supplied to the control unit 110, and is reflected in the operation of the mobile unit 100. Further, the information processing unit of the mobile unit 100 instructs the imaging device 200 to perform re-imaging.

In the embodiment described above, in a case where the mobile unit 100 receives a notification of failed imaging from the imaging device 200, the mobile unit 100 performs a predetermined process such as re-imaging in accordance with the type of the imaging failure. However, the imaging device 200 may perform a process (re-imaging control or the like) in the case of failed imaging.

The present technology is not limited to a drone (a motorized miniature aircraft), and may be applied to an automobile, a ship, a robot, or the like that can be equipped with the imaging device 200, and move by its own power without any operation by a person.

The present technology may also be applied not only to a digital camera but also to any kind of device that has an imaging function and can be mounted on the mobile unit 100, such as a smartphone, a mobile phone, a portable game console, a notebook computer, or a tablet terminal.

Although notifications of failed imaging and notifications of successful imaging are made in the above embodiment, any notification may not be made in the case of failed imaging, and a notification may be made only in the case of successful imaging.

In the above embodiment, an out-of-focus captured image and exposure outside a predetermined range have been described as specific examples of failed imaging. However, failed imaging is not limited to those examples, and may be any failure relating to the parameter for a captured image.

The imaging device 200 may include an input unit, a display unit, and the like. Further, the imaging device 200 may be used independently as the imaging device 200, without being connected to the mobile unit 100.

The battery 6 may be included in the imaging device 200, and the battery 6 of the imaging device 200 may supply electric power to the mobile unit 100. Alternatively, both the mobile unit 100 and the imaging device 200 may be equipped with a battery.

Communication between the mobile unit 100 and the imaging device 200 may be performed through wireless communication.

Although communication between the mobile unit 100 and the imaging device 200 is performed using the USB communication standard PTP in the above embodiment, any communication method may be used, as long as transmission/reception of various kind of data and notifications of failed imaging can be performed between the mobile unit 100 and the imaging device 200.

The present technology may also be applied to video recording. In the case of video recording, it is also possible to notify the mobile unit 100 of a recording result through the imaging result notification process described above with reference to FIG. 6. However, image analysis to determine whether or not focusing on the object is achieved is to be performed on the frame images constituting the video image, and therefore, a notification of failed imaging may be made. This is because it is normally considered that there are more successes than failures in imaging, and therefore, if notifications of successful imaging are made, a success notification will be made for each frame image, resulting in an enormous amount of processing being involved in making success notifications.

The present technology may also be embodied in the configurations as described below.

(1)

An information processing device that operates in an imaging device mounted on a mobile unit, the information processing device notifying the mobile unit of failed imaging, when imaging by the imaging device has failed.

(2)

The information processing device according to (1), in which a check is made to determine whether or not imaging has failed, on the basis of an image captured by the imaging device and/or information related to the image.

(3)

The information processing device according to (1) or (2), in which, when an image captured by the imaging device is out of focus, a notification of failed imaging is sent.

(4)

The information processing device according to any one of (1) to (3), in which, when exposure of an image captured by the imaging device is not in a predetermined range, a notification of failed imaging is sent.

(5)

The information processing device according to any one of (1) to (4), in which position information indicating an imaging position of an image captured by the imaging device is obtained, and, when the imaging position is not a predetermined position, a notification of failed imaging is sent.

(6)

The information processing device according to any one of (1) to (5), in which time information indicating an imaging time of an image captured by the imaging device is obtained, and, when the imaging time is not a predetermined time, a notification of failed imaging is sent.

(7)

The information processing device according to any one of (1) to (6), in which position information indicating an imaging position of an image captured by the imaging device is obtained, and, when the imaging position deviates from a series of predetermined constant distance intervals, a notification of failed imaging is sent.

(8)

The information processing device according to any one of (1) to (7), in which time information indicating an imaging time of an image captured by the imaging device is obtained, and, when the imaging time deviates from a series of predetermined constant time intervals, a notification of failed imaging is sent.

(9)

The information processing device according to (1) or (2), in which, when imaging has not been performed at a predetermined position and/or a predetermined time, a notification of failed imaging is sent.

(10)

The information processing device according to (1), in which, when an image is not obtained through imaging performed by the imaging device, a notification of failed imaging is sent.

(11)

The information processing device according to (10), in which, when a remaining capacity of a storage unit in the mobile unit or the imaging device is equal to or smaller than a predetermined amount, a notification of failed imaging is sent, the storage unit storing a captured image.

(12)

The information processing device according to (10) or (11), in which, when there is an error in writing of an image captured by the imaging device into a storage unit in the mobile unit or the imaging device, a notification of failed imaging is sent.

(13)

The information processing device according to any one of (10) to (12), in which, when a remaining amount in a battery in the mobile unit or the imaging device is equal to or smaller than a predetermined amount, a notification of failed imaging is sent.

(14)

The information processing device according to any one of (1) to (13), in which, when imaging performed by the imaging device is successful, a notification of the successful imaging is sent to the mobile unit.

(15)

An information processing method for notifying a mobile unit of failed imaging when imaging performed by an imaging device mounted on the mobile unit has failed.

(16)

An information processing program for causing a computer to implement an information processing method for notifying a mobile unit of failed imaging when imaging performed by an imaging device mounted on the mobile unit has failed.

(17)

An information processing device that operates in a mobile unit on which an imaging device is mounted, the information processing device determining whether or not imaging performed by the imaging device has failed.

(18)

The information processing device according to (17), in which, when the imaging performed by the imaging device has failed, a re-imaging instruction is issued to the imaging device.

(19)

The information processing device according to (17) or (18), in which, when the imaging performed by the imaging device has failed, a moving route for the mobile unit is set.

(20)

The information processing device according to any one of (17) to (19), in which, when the imaging performed by the imaging device has failed, a notification of the failed imaging is sent to an external device.

REFERENCE SIGNS LIST

100 Mobile unit
200 Imaging device
300 Information processing unit

The invention claimed is:

1. An information processing device in an imaging device, comprising:
 a processing unit configured to:
  receive an instruction from a mobile unit;
  control the imaging device to perform an imaging operation on a plurality of points based on the received instruction;
  compare the plurality of points with a plurality of marked points on a map;
  analyze a deviation of at least one point of the plurality of points from corresponding at least one marked point of the plurality of marked points on the map, wherein the analysis of the deviation is based on the comparison; and
  notify a failure of the performance of the imaging operation on the at least one point, wherein the notification of the failure is based on the analysis of the deviation.

2. The information processing device according to claim 1, wherein the processing unit is further configured to determine the failure of the performance of the imaging operation based on at least one of an image captured by the imaging device and/or information related to the image.

3. The information processing device according to claim 2, wherein
 the processing unit is further configured to notify the failure of the performance of the imaging operation based on the image, and
 the image is out of focus with respect to the imaging device.

4. The information processing device according to claim 2, wherein the processing unit is further configured to notify the failure of the performance of the imaging operation based on exposure of the image with respect to a range.

5. The information processing device according to claim 2, wherein the processing unit is further configured to obtain position information that indicates an imaging position of the image captured by the imaging device.

6. The information processing device according to claim 2, wherein the processing unit is further configured to:
 acquire time information that indicates imaging time of the image captured by the imaging device, and
 notify the failure of the performance of the imaging operation based on the time information with respect to a specific.

7. The information processing device according to claim 2, wherein the processing unit further configured to:

obtain position information that indicates indicating an imaging position of the image captured by the imaging device; and identify the deviation of the at least one point from the corresponding at least one marked point based on the obtained position information.

8. The information processing device according to claim 2, wherein the processing unit is further configured to:
obtain time information that indicates an imaging time of the image captured by the imaging device; and
notify the failure of the performance of the imaging operation based on deviation of the imaging time from a series of constant time intervals.

9. The information processing device according to claim 2, wherein the processing unit is further configured to notify the failure of the performance of the imaging operation based on failure to perform the imaging operation at one of a specific position or a specific time.

10. The information processing device according to claim 1, wherein the processing unit is further configured to notify the failure of the performance of the imaging operation based on acquisition of an image captured by a device other than the imaging device.

11. The information processing device according to claim 10, wherein
the image is stored in a storage unit, and
the processing unit is further configured to notify the failure of the performance of the imaging operation based on a capacity of the storage unit is equal to or smaller than a specific storage capacity.

12. The information processing device according to claim 10, wherein the processing unit is further configured to notify the failure of the performance of the imaging operation based on is an error in a write operation of the image into a storage unit.

13. The information processing device according to claim 10, wherein
the processing unit is further configured to notify the failure of the performance of the imaging operation based on estimated utilization of a battery equal to or smaller than a specific estimated utilization, and
the battery powers the imaging device.

14. The information processing device according to claim 1, wherein the processing unit is further configured to notify success of the performance of the imaging operation based on successful image capture by the imaging device.

15. An information processing method, comprising:
receiving an instruction from a mobile unit;
controlling an imaging device to perform an imaging operation on a plurality of points based on the received instruction;
comparing the plurality of points with a plurality of marked points on a map;
analyzing a deviation of at least one point of the plurality of points from corresponding at least one marked point of the plurality of marked points on the map, wherein the analysis of the deviation is based on the comparison; and
notifying a failure of the performance of the imaging operation on the at least one point, wherein the notification of the failure is based on the analysis.

16. A non-transitory computer-readable medium having stored thereon, computer-executable instructions which, when executed by a computer, cause the computer to execute operations, the operations comprising: receiving an instruction from a mobile unit;
controlling an imaging device to perform an imaging operation on a plurality of points based on the received instruction;
comparing the plurality of points with a plurality of marked points on a map;
analyzing a deviation of at least one point of the plurality of points from corresponding at least one marked point of the plurality of marked points on the map, wherein the analysis of the deviation is based on the comparison; and
notifying a failure of the performance of the imaging operation on the at least one point, wherein the notification of the failure is based on the analysis of the deviation.

17. An information processing device that operates in a mobile unit, comprising:
a processing unit configured to:
receive an instruction from the mobile unit;
control an imaging device to perform an imaging operation on a plurality of points based on the received instruction;
compare the plurality of points with a plurality of marked points on a map;
analyze a deviation of at least one point of the plurality of points from corresponding at least one marked point of the plurality of marked points on the map, wherein the analysis of the deviation is based on the comparison; and
notify a failure of the performance of the imaging operation on the at least one point, wherein the notification of the failure is based on the analysis of the deviation.

18. The information processing device according to claim 17, wherein the processing unit is further configured to issue a re-imaging instruction based on the notification.

19. The information processing device according to claim 17, wherein the processing unit is further configured to set a moving route of the mobile unit based on the notification of the failure of the performance of imaging.

20. The information processing device according to claim 17, wherein the processing unit is further configured to send the notification to an external device.

* * * * *